Patented Nov. 21, 1939

2,180,729

UNITED STATES PATENT OFFICE 2,180,729

PAINT AND TILE BASE

Frank W. Corkery, Crafton, Pa.

No Drawing. Application June 18, 1937,
Serial No. 148,962

2 Claims. (Cl. 260—23)

This invention relates to a paint and tile base comprising a drying oil or a mixture of drying oils oxidized in admixture with an unsaturated oil derived from coal.

Specifically, I have discovered that a mixed oxidized oil having many useful qualities may be produced by oxidizing in admixture one or more of the drying oils, such as linseed oil, China-wood oil, rapeseed oil, and the coal-derived oil which I herein term dipolymer oil. This dipolymer oil is of cyclic composition, and has its more proximate derivation in the light oil which is distilled over in the by-product coking of coal, or the light oil which is distilled from the tar of by-product coking, and purified by the removal of tarry acids and bases. The immediate derivation of the dipolymer oil is either from still residue produced residually in the fractionation and purification of light oil in the production of solvent naphthas, benzol, toluol, or the like, or is produced by polymerization conducted in crude heavy solvent naphtha.

Briefly to discuss the still residue from which dipolymer oil may be obtained, such still residue may be produced from the fractionation of light oil in initial, or "crude," stills; may be obtained as a residue of distillation after acid purification and neutralization of the light oil or light oil fractions; or may be obtained as bottoms in the stills by which a fractionation into No. 1 crude solvent naphtha (xylol) and No. 2 crude heavy solvent naphtha is effected. It is usually a mixture from all these sources, and is in degree contaminated by sulphates and sulphonates.

The various still residues, because of the heat treatment, or acid purification treatment, or both of such treatments, to which the light oil is subjected, comprise a large percentage of polymers of the light oil unsaturates, such as coumarone, indene and styrene, in varying proportions. While some of such polymers are in a stage of polymerization which forms solid resin, others are in the form of dimers, and it is the dimers of the polymerizable reactives of the light oil which largely constitute dipolymer oil as derived from still residue. To recover the dipolymer oil from the still residue, the still residue is subjected to distillation. Distillation desirably may be conducted under a subatmospheric pressure of 20 inches of mercury, and with steam, at a still temperature of about 550° F. If naphthalene and hydrocarbons of solvent grade are present these are first distilled off, and the dipolymer oil then comes over as the still temperature is increased to the point at which distillation to a solid residuum is effected. This dipolymer oil is readily condensed and recovered.

Dipolymer oil is also produced by polymerization in crude heavy solvent naphtha, or equivalent liquid derived from coke-oven light oil, drip oil, or the like, by some polymerization process of the same type as that which produces solid coumarone type resin. In accordance with the conditions of the polymerization process, a greater or lesser proportion of the polymerizable resin-forming reactives remain in the first stage of polymerization as dimers to form dipolymer oil, and is separated by steam distillation from the higher polymers forming solid resin. A large proportion of the reactives present go to form dipolymer oil if the conditions of the polymerization process be such that a very moderate catalytic effect is exerted during the polymerization process.

The dipolymer oil with which I am herein concerned may be obtained in either manner as above described, or may be a mixture of dipolymer oil obtained from still residue and dipolymer oil obtained from a polymerization process conducted in crude solvent naphtha, or its equivalent.

Initially, I may state that I have discovered dipolymer oil to be an effective solvent for the gel structures produced by oxidation of drying oils, and that it is capable of dispersing very high gel structures of that type. Also, I have discovered that by oxidizing in admixture drying oil and dipolymer oil, a simple process of oxidation may be employed to carry the oil to an extremely high gel structure which would be unattainable if it were attempted so to oxidize the drying oil unaccompanied by the dipolymer oil under the same simple conditions of oxidation.

The general oxidation procedure which I employ to produce an oxidized paint oil or base from a mixture of drying oil and dipolymer oil is substantially that disclosed in my copending application Serial No. 62,045, filed February 3, 1936, issued as Patent No. 2,135,425.

To summarize such oxidizing procedure, a mixture of one or more drying oils with dipolymer oil is subjected in a treating vessel to a dispersion of air or, if desired, oxygen in greater or lesser condition of purity, forced under pressure through the mixture of oils. Desirably the oil mixture is raised to a temperature of about 175° F. to facilitate the passage of air or oxygen, and may be maintained approximately constant throughout the process of oxidation. In utilizing dipolymer oil as the gel-dispersing ingredient of the composition, rather than still residue as disclosed in my co-pending application above noted, I am able to continue oxidation to a high stage without increase in temperature.

If, as is desirable, air be utilized as the oxidizing agent, and if it be supplied for dispersion through the mixed oils in good volume and under an adequate pressure, such as a 5 pound pressure for a 10 foot head of the mixed oil, an oxidizing treatment for 5 days serves to increase the viscosity of the mixture from about 100 Saybolt seconds at 210° F. to about 1000 Saybolt seconds at 210° F. After oxidation has reached such stage, increase in viscosity becomes relatively rapid. Thus I have found that a treating period of 6 days raises the viscosity of the mixed oil from 100 Saybolt seconds to 1700 Saybolt seconds, both at 210° F. Similarly, after 7 days of oxidizing treatment the viscosity approximates 3000; after 8 days of oxidizing treatment the viscosity aproximates 5000; and after 9 days of oxidizing treatment the oil mixture has a viscosity of 10,000 Saybolt seconds at 210° F. The exemplary treatment given is conducted without the use of any catalyst and with ordinary atmospheric air. Some slight advantage may be obtained by replacing air with oxygen, although I have not found that the saving in time compensates for the increased cost of the gas. The time may be greatly shortened by use of an appropriate catalyst, such as lead, manganese, or cobalt salts in suitable oil-soluble form.

It should be particularly noted that, in a drying oil, a gel structure as high as that represented by a viscosity of 10,000 Saybolt seconds at 210° F. cannot be commercially produced by a simple blowing operation, conducted upon the oil by itself; and that such product if it be formed by blowing cannot, because of its lack of thermoplasticity, be readily removed from the treating vessel.

The product obtained by oxidizing together a drying oil or mixture of drying oils and dipolymer oil is light in color, is clear and transparent, having a reddish cast, and may be caused to flow when heated to a moderate temperature. For example, at a viscosity of 10,000 Saybolt seconds the product is a solid at normal room temperature, but has no definite melting point. The outstanding characteristic of the composition is the high gel structure, which is developed in a simple and commercial manner, and which renders the pitchy product particularly valuable as a component of a binder composition for mastic tile, linoleum, and the like. Because of the high gel structure possessed by the composite product of oxidation, it may be combined in relatively great proportion with a tile resin without unduly lowering the melting-point of the composition, and therefore in conjunction with a suitable resin tends to give a tile binder composition of high elasticity combined with a high melting-point.

It has been noted in my application, to which reference has been made above, and also my co-pending application Serial No. 130,908, filed March 15, 1937 issued as Patent No. 2,135,428, that the oxidation of still residue from the treatment of coke-oven light oil and a drying oil in admixture gives a pitch-like product, or synthetic pitch, which is of a color so much lighter than that of the by-product pitches of animal, vegetable, or marine origin, that it may with increased satisfaction and economy be utilized in tile and linoleum, pigmented in lighter shades, or it may be more lightly pigmented. Whereas such natural pitches are very dark, and a synthetic pitch produced by oxidizing drying oil and still residue in admixture has a color intensity approximating what is known on the coal tar color scale as a No. 10 to No. 12 color, the pitch-like product which I obtain by oxidizing together dipolymer oil and drying oil has a color intensity of about 6 to 8 on the coal tar resin color scale. In its color it is therefore to be considered an improvement upon a synthetic pitch as produced from still residue, permitting the use of a darker resin as the resin component of a tile binder composition, or, conversely, lessening the quantity of pigment necessarily used in making mastic tile or linoleum which is white or which is pigmented in light shades.

When the oxidizing treatment is discontinued at such point that the mixed oil is of lower viscosity, such as a viscosity of from 500 Saybolt seconds to 2000 Saybolt seconds, both at 210° F., it is useful in heavy duty coatings, caulking compounds, and as a component of marine engine oil to promote adhesion of a lubricating oil to surfaces which are wet with water. It may also be used for numerous other purposes, for example, as a content of putties, inks, adhesives and the like, and for general plasticizing purposes.

The relative proportions of the dipolymer oil and the drying oil may be varied at will, unless the mixture is to be carried to such viscosity that an extremely high gel structure is developed in the drying oil. I have found that an inclusion of dipolymer oil in a proportion of from 40% to 50% the weight of the oil mixture is sufficient so to disperse the highly oxidized drying oil, that the mixture may without difficulty be carried to viscosities of 10,000 Saybolt seconds at 210° F., and above. An increased proportion of dipolymer oil is useful when oxidizing to extreme viscosities, such as viscosities of the order of 20,000 to 30,000 Saybolt seconds at 210° F.

Further to define the "dipolymer" oil, which I oxidize in admixture with a drying oil, or oils, it is an oily substance, composed largely of the dimers of the light oil unsaturates (such as coumarone, indene, and possibly styrene), high boiling cyclic oils, and reaction products of the various primary components. It has a specific gravity of about 1.055 at 60° F. It has a viscosity of about 100 Saybolt seconds at 210° F., and a viscosity of about 270 Saybolt seconds at 100° F. Preponderantly it boils within the approximate range of 300° C. to 370° C., and a large part of its weight distills close to 340° C. As initially produced, it is of a pale yellow color, and is non-volatile at ordinarily encountered temperatures.

Further to consider the proportioning of the drying oil, and the "dipolymer" oil, it should be understood that the drying oils vary in gel structure development and that it is not possible to give a definite lower limit of dipolymer oil inclusion adequate to carry the oil to a particular viscosity by serving to disperse the gel structure of the drying oil. Thus rape seed oil, sunflower seed oil, soya bean oil, and fish oil are examples of drying oils which, because of their relatively high olein content demand a lower proportion of "dipolymer" oil than do, for example linseed oil, and low cold test sardine oil. Perilla oil and China-wood oil are examples of oils requiring a high proportion of "dipolymer" oil in order that the mixture may attain the highest viscosities.

As mixed with drying oils for pitch production, dipolymer oil may contain in solution a small percentage of polymers of coumarone and indene higher than dimers and still for this purpose be considered a "dipolymer" oil. It is, however, a fact that in proportion to their inclusion, the pitchy qualities of the product, such as elasticity, are decreased. In the higher-viscosity grades of the material it is, therefore, desirable that the proportion of such higher polymers be kept low in order that the benefits peculiar to the use of "dipolymer" oil be to the maximum obtained. In the lower viscosities proposed for use in heavy duty coatings, and the like, the presence of a large proportion of higher polymers in the "dipolymer" oil may be tolerated.

I claim as my invention:

1. As a material of commerce the herein described viscous elastic composition suitable for use in association with a resin in a binder composition for mastic tile which is solid at normal room temperature and having a color intensity below a No. 10 color on the coal tar resin color scale; said composition consisting of a self-compatible oxidized mixture of an oxidizable drying oil and an oily aromatic substance composed preponderantly of the dimers of coumarone and indene and having by virtue of freedom from any substantial content of polymers in stages of polymerization higher than that of the dimers elasticity in high order and no definite melting point, the said material consisting in substantial proportion of its oxidized aromatic initially oily component and being solid at normal room temperature.

2. As a material of commerce the herein described viscous elastic composition suitable for use in association with a resin in a binder composition for mastic tile which is solid at normal room temperature having a viscosity from about 2000 to as much as 10,000 Saybolt seconds at 210° F. and having a color intensity below a No. 10 color on the coal tar resin color scale; said composition consisting of a self-compatible oxidized mixture of an oxidizable drying oil and an oily aromatic substance composed preponderantly of the dimers of coumarone and indene and having by virtue of freedom from any substantial content of polymers in stages of polymerization higher than that of the dimers elasticity of high order and no definite melting point; the said material consisting in substantial proportion of its oxidized aromatic initially oily component.

FRANK W. CORKERY.